United States Patent
Scheller et al.

(10) Patent No.: US 10,848,487 B2
(45) Date of Patent: Nov. 24, 2020

(54) BIO-AUTHENTICATION FOR STREAMING SERVICE ACCOUNT MANAGEMENT

(71) Applicant: CenturyLink Intellectual Property LLC, Denver, CO (US)

(72) Inventors: James D. Scheller, Windsor, CO (US); Tom Funk, Littleton, CO (US); Rick Calvert, Columbia, IL (US); Stephen Opferman, Denver, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 151 days.

(21) Appl. No.: 15/980,332

(22) Filed: May 15, 2018

(65) Prior Publication Data
US 2019/0281049 A1 Sep. 12, 2019

Related U.S. Application Data

(60) Provisional application No. 62/641,152, filed on Mar. 9, 2018.

(51) Int. Cl.
*H04L 29/06* (2006.01)

(52) U.S. Cl.
CPC ........ *H04L 63/0861* (2013.01); *H04L 63/102* (2013.01)

(58) Field of Classification Search
CPC .......................... H04L 63/0861; H04L 63/102
USPC .................................................................. 726/4
See application file for complete search history.

(56) References Cited

U.S. PATENT DOCUMENTS

| 7,529,710 B1* | 5/2009 | Clower | G06Q 20/10 705/39 |
|---|---|---|---|
| 9,619,635 B2* | 4/2017 | Takagi | H04L 63/0861 |
| 2002/0188854 A1* | 12/2002 | Heaven | H04L 63/0861 713/186 |
| 2004/0123106 A1* | 6/2004 | D'Angelo | G06F 21/32 713/171 |
| 2014/0230032 A1* | 8/2014 | Duncan | G06F 21/32 726/7 |

(Continued)

OTHER PUBLICATIONS

A caching and streaming framework for multimedia Shantanu Paknikar, Mohan kankanhalli, K.R. Ramakrishnan, S.H. Srininvasan Proceedings of the eighth ACM international conference on Multimedia. Oct. 2000, pp. 13-20 (Year: 2000).*

(Continued)

*Primary Examiner* — Kambiz Zand
*Assistant Examiner* — Mohammad S Shams

(57) ABSTRACT

Novel tools and techniques for a bio-authentication for streaming service account management are provided. A system includes a user device configured to access a streaming service account associated with a subscriber, a database, a biometric sensor configured to obtain a biometric input from a user, and a bio-authentication engine. The bio-authentication engine may include a processor, and a non-transitory computer readable medium comprising instructions executable by the processor to determine whether an authentication event has occurred, obtain the biometric input of the user, determine whether the biometric input matches the biometric information associated with the subscriber, and allow access to a streaming service through the streaming service account.

20 Claims, 5 Drawing Sheets

(56) References Cited

U.S. PATENT DOCUMENTS

| | | | | |
|---|---|---|---|---|
| 2014/0337930 A1* | 11/2014 | Hoyos | | H04L 63/10 |
| | | | | 726/4 |
| 2015/0135336 A1* | 5/2015 | Arasavelli | | H04B 7/26 |
| | | | | 726/29 |
| 2015/0244699 A1* | 8/2015 | Hessler | | G06F 21/44 |
| | | | | 726/7 |
| 2015/0257004 A1* | 9/2015 | Shanmugam | | H04W 12/0605 |
| | | | | 455/411 |
| 2016/0065571 A1* | 3/2016 | Hoyos | | H04L 63/0435 |
| | | | | 713/168 |
| 2016/0085565 A1* | 3/2016 | Arcese | | G06F 21/32 |
| | | | | 726/7 |
| 2016/0112416 A1* | 4/2016 | Brown | | G06F 16/84 |
| | | | | 726/5 |
| 2017/0013464 A1* | 1/2017 | Fish | | H04W 12/06 |
| 2017/0032375 A1* | 2/2017 | Van Os | | G06Q 20/40145 |
| 2017/0124312 A1* | 5/2017 | Inoue | | H04L 63/0861 |
| 2017/0134374 A1* | 5/2017 | Dow | | H04L 63/0861 |
| 2017/0149840 A1* | 5/2017 | Zhang | | H04L 63/205 |
| 2017/0163637 A1* | 6/2017 | Peterson | | H04L 63/04 |
| 2017/0372320 A1* | 12/2017 | Komminoth | | H04L 63/0861 |
| 2018/0212960 A1* | 7/2018 | Sandeep | | H04L 63/0861 |
| 2018/0335928 A1* | 11/2018 | Van Os | | G06Q 20/204 |
| 2018/0375859 A1* | 12/2018 | Huh | | G06F 21/32 |
| 2019/0058702 A1* | 2/2019 | Kurian | | H04L 63/102 |
| 2019/0123907 A1* | 4/2019 | Kim | | H04L 9/302 |
| 2019/0220583 A1* | 7/2019 | Douglas | | G06F 21/316 |
| 2019/0222567 A1* | 7/2019 | Caldera | | G06F 21/45 |
| 2019/0281049 A1* | 9/2019 | Scheller | | H04L 63/0861 |
| 2019/0318361 A1* | 10/2019 | Hurst | | G06Q 20/383 |

OTHER PUBLICATIONS

Multi-core architectures and streaming applications Gerard J.M. Smit, Andre B.J. Kokkeler, Pascal T. Wolkotte, Marcel D. van de Burgwal SLIP '08: Proceedings of the 2008 international workshop on system level interconnect prediction pp. 35-42 (Year: 2008).*

* cited by examiner ced. In other embodiments, a computer system might include

BIO-AUTHENTICATION FOR STREAMING SERVICE ACCOUNT MANAGEMENT

CROSS-REFERENCES TO RELATED APPLICATIONS

This application claims priority to U.S. Patent Application No. 62/641,152 (the "'152 application"), filed Mar. 9, 2018 by James D. Scheller et al., entitled, "Bio-authentication for Streaming Service Account Management," the entire disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to account management and authentication, and more particularly to tools and techniques for bio-authentication based account management for streaming applications.

BACKGROUND

Subscription-based media streaming services have become a mainstream form of consuming various types of media, such as music, movies, television shows, podcasts, webcasts, live events, and live streams. Typically, users gain access to their various subscription-based media streaming services using an account username and password associated with a paying subscriber. Many users of subscription-based media streaming services, however, admit to sharing passwords with non-paying users, or to using the passwords of paying subscribers while not having a paid subscription themselves.

Some streaming services have taken steps to limit or control password sharing by a subscriber. For example, some stream service providers have limited the number of concurrent logins with a single account, or the number of devices authorized to logon with the username and password. However, these solutions may be both over-inclusive (preventing a paying subscriber from accessing the streaming service from each of their respective devices) and/or under-inclusive (allowing multiple non-paying users to access streaming services from a single account) in their implementations.

Thus, while media streaming service providers have accepted or allowed password sharing by subscribers with non-subscribing members, password sharing is a significant cause of lost revenue for many streaming service platforms. Accordingly, tools and techniques for bio-authentication based account management are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
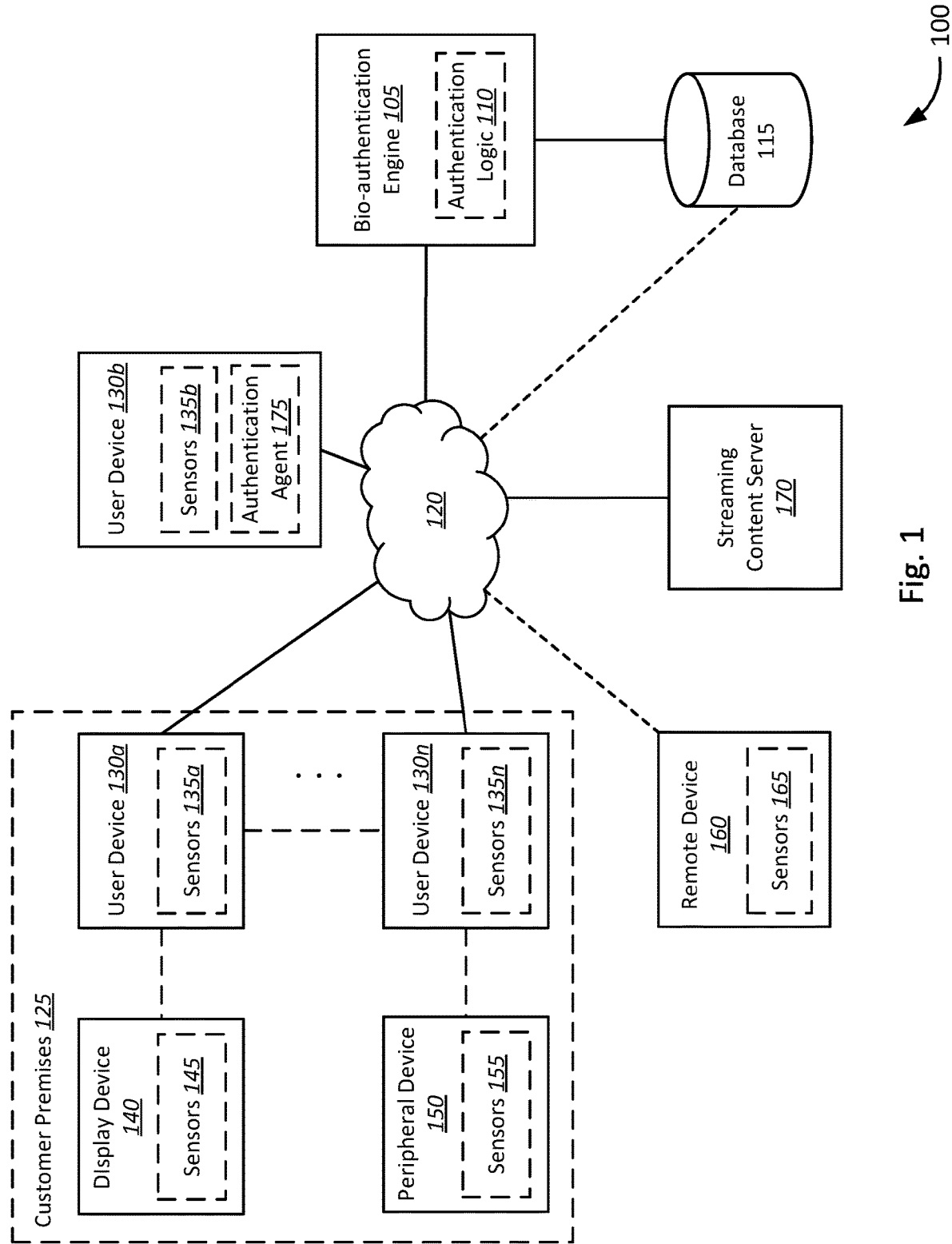
FIG. 1 is a block diagram of a topology of a system for bio-authentication based streaming service account management, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for bio-authentication based streaming service account management is provided. The system may include a user device, database, biometric sensor, and bio-authentication engine. The user device may be configured to access a streaming service account, wherein the streaming service account is associated with a subscriber. The database may be configured to store biometric information associated with the subscriber. The biometric sensor may be configured to obtain a biometric input from a user. The bio-authentication engine may be in communication with the user device, database, and the biometric sensor, and further include a processor, and a non-transitory computer readable medium comprising instructions executable by the processor to perform various functions. The instructions may be executable to determine whether an authentication event has occurred, and in response to determining that the authentication event has occurred, obtain, via the biometric sensor, the biometric input of the user. The instructions may further be executable to determine whether the biometric input matches the biometric information associated with the subscriber, and in response to determining that the biometric input matches the biometric information, allow access to a streaming service through the streaming service account.

In another aspect, an apparatus for bio-authentication based streaming service account management is provided. The apparatus may include a processor, and a non-transitory computer readable medium comprising instructions executable by the processor to perform various functions. The instructions may be executable to determine whether an authentication event has occurred, and in response to determining that the authentication event has occurred, obtain, via a biometric sensor, a biometric input of a user. The instructions may be further executable to determine whether the biometric input matches biometric information associated with a subscriber of a streaming service account, and in response to determining that the biometric input matches the biometric information, allow access to a streaming service through the streaming service account.

In a further aspect, a method for bio-authentication based streaming service account management is provided. The method includes determining, via a bio-authentication engine, whether an authentication event has occurred, and in response to determining that the authentication event has occurred, obtaining, via a biometric sensor, a biometric input of a user. The method continues by determining, via the bio-authentication engine, whether the biometric input matches biometric information associated with a subscriber of a streaming service account, and in response to determining that the biometric input matches the biometric information, allowing, via the bio-authentication engine, access to a streaming service through the streaming service account.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a block diagram of a system 100 for bio-authentication based streaming service account management, in accordance with various embodiments. The system 100 includes a bio-authentication engine 105 having authentication logic 110, database 115, network 120, customer premises 125, user device 130a-130n (collectively "user devices 130"), one or more sensors 135a-135n, display device 140, one or more sensors 145, peripheral device 150, one or more sensors 155, remote device 160, one or more sensors 165, streaming content server 170, and authentication agent 175. It should be noted that the various components of the system 100 and associated topologies are schematically illustrated in FIG. 1, and that modifications to the architecture or topological arrangement of the system 100 may be possible in accordance with various embodiments.

In various embodiments, the bio-authentication engine 105 may optionally include authentication logic 110. The bio-authentication engine 105 may be coupled to the database 115. The bio-authentication engine 105 may further be coupled to network 120. The database 115 may also optionally be coupled to the network 120. A customer premises 125 may include one or more user devices 130a-130n in communication with the network 120. Each of the user devices 130 may optionally include one or more sensors 135a-135n. The user device 130a may be coupled to a display device 140, which may also optionally include one or more sensors 145. The user device 130n may be coupled to a peripheral device 150, which may include one or more sensors 155. A user device 130b may further optionally include an authentication agent 175. A remote device 160 may further be coupled to the network 120. The remote device 160 may optionally include one or more sensors 165. A streaming content server may be coupled to the network 120. Each of the user devices 130 may be coupled one or more of the bio-authentication engine 105, database 115, remote device 160, and streaming content server 170 via the network 120. A user device 130a-130n may further be coupled to other user devices 130a-130n Similarly, a remote device 160 may be coupled to one or more of the bio-authentication engine 105, database 115, user device 130, and streaming content server 170 via the network 120.

In various embodiments, the bio-authentication engine 105 may include both hardware, software, or both hardware and software. The bio-authentication engine 105 may include, without limitation, one or more machine readable instructions, such as a computer program or application, a server computer hosting the software, a dedicated custom hardware, such as a single-board computer, field programmable gate array (FPGA), modified GPU, application specific integrated circuit (ASIC), or a system on a chip (SoC). In further embodiments, the bio-authentication engine 105 may further include a specifically targeted hardware appliance, or alternatively, a database-driven device that performs various functions via dedicated hardware as opposed to a central processing unit (CPU).

In various embodiments, the bio-authentication engine 105 may be configured to determine when to authenticate (e.g., bio-authenticate) a user associated with a streaming service account. Bio-authentication, as used herein, may refer to authentication of a user based on the biometric information of the user. Thus, a user associated with a streaming service account may be uniquely authenticated via the biometric information. In some embodiments, a streaming service account may be associated with more than one user, but the total number of number of users authorized to use the streaming service account may be limited. Accordingly, in some embodiments, bio-authentication may be completed by any authorized user associated with the streaming service account or each authorized user.

In some embodiments, the bio-authentication engine 105 may be configured to determine whether to authenticate a user associated with a streaming service account based on the occurrence of an authentication event. An authentication event may be an event configured to trigger the bio-authentication engine 105 to request, or alternatively, obtain biometric information from a user for bio-authentication. An authentication event may include events in which a streaming service account is accessed, but the identity of the user accessing the streaming service account is unknown. For example, authentication events may include, without limitation, account creation; or token-based (e.g., digital certificate, signature, etc.) and/or knowledge-based (e.g., username and password, pin number, etc.) logins into the streaming service account such as a first-time account login using token-based and/or knowledge-based authentication, multiple concurrent account logins using token-based and/or knowledge-based authentication, account login from a new device using token-based and/or knowledge-based authentication, account login from a new network location using token-based and/or knowledge-based authentication, account login from a new physical location using token-based and/or knowledge-based authentication.

In further examples, an authentication event may be time-based, and configured to occur, for example, periodically or after the expiration of a time-out period from the last bio-authentication. Time-based authentication events may, in some examples, be device specific and thus occur periodically for each device logged into a streaming service account. Alternatively, time-based authentication events may be associated with the streaming service account across all devices. Thus, an authentication event may cause a user to bio-authenticate across all devices associated with the streaming service account, or alternatively, a bio-authentication at one device may be sufficient across all devices associated with the streaming service account.

In further embodiments, an authentication event may be triggered upon request, for example, by a streaming service provider. A streaming service provider may be the provider of a respective streaming service. The streaming service provider may, in some embodiments, cause an authentication event to be triggered at the bio-authentication engine 105 for the streaming service account. In some embodiments, bio-authentication may be requested each time the streaming service is accessed by a streaming service account.

In another set of embodiments, the bio-authentication engine 105 may include authentication logic 110. Authentication logic 110 may include a computer readable medium including one or more machine readable instructions that are executable by the hardware and/or software of the bio-authentication engine 105 to perform various functions. In some embodiments, the authentication logic 110 may further include, for example, an artificial intelligence (AI) engine configured to automatically determine situations in which bio-authentication should be triggered. For example, in some embodiments, the AI engine may be configured to obtain one or more data streams associated with a streaming service account, or alternatively data streams associated with multiple streaming service accounts across a streaming service platform.

Data streams may include, for example, data generated by various devices associated with a respective streaming service account. In some embodiments, data streams may be generated continuously and pushed by the devices substantially in real-time. In other embodiments, the bio-authentication engine 105 may obtain data by polling the devices periodically, or upon request. In yet further embodiments, data from the various devices may be transmitted, organized, and stored in a database 115. The database 115 may include either (or both) a relational (e.g., a structured query language (SQL) database, Apache Hadoop distributed file system, ElasticSearch index) database, or a non-relational (e.g., NoSQL) database. Thus, the AI engine may be configured to cause the bio-authentication engine to obtain data from the database 115.

Thus, in some embodiments, the bio-authentication engine 105 may be configured to decide, based on the one or more data streams, whether to request bio-authentication of a user. The one or more data streams may include various types of data associated with one or more streaming service accounts and/or subscribers (e.g., authorized users) associated with the streaming service accounts. For example, the one or more data streams may include subscriber information, service attributes, subscription information, usage information, performance metrics, state information, fault information, and other telemetry data from user devices 130 associated with one or more streaming service accounts. Metadata may further include information about the one or more subscribers, such as types of content, browsing history, browsing patterns, titles of programs, favorite actors, recent activity, language, closed captioning information, electronic programming guide information, other information about a subscriber's usage of the streaming service.

Thus, in a set of embodiments, the AI engine may utilize a rules-based approach to determining whether to bio-authenticate a user. For example, in some embodiments, one or more thresholds for one or more respective rules may be determined by the AI engine. The one or more thresholds may indicate respective threshold values for one or more data streams associated with a streaming service account. If a threshold is exceeded, a user associated with the streaming service account may be bio-authenticated. In some embodiments, the one or more thresholds may be determined based on information from one or more data streams associated with the streaming service account. In other embodiments, the one or more thresholds may be determined based on information from one or more data streams across the streaming service platform, including other streaming service accounts. A threshold may include, for example, and without limitation, an amount of time (e.g., a timeout period) after which a user is bio-authenticated, number of logins before a user is bio-authenticated, a number of devices before a user must be authenticated, a geographic range outside of which the user must be bio-authenticated, or other such values. In some embodiments, the bio-authentication engine 105 may be configured to determine the threshold dynamically (e.g., updating the threshold in real-time), on-demand, or upon request (e.g., by a streaming service provider).

In other embodiments, the AI engine may be configured to implement a correlation-based approach. For example, bio-authentication engine 105 may be configured to construct groupings and relationships based on one or more data streams. In some examples, the bio-authentication engine 105 may be configured to determine whether an anomaly has occurred. For example, the bio-authentication engine 105 may be configured to generate, based on historic usage activity (e.g., usage pattern), a predicted pattern of usage for a streaming service account. Accordingly, the bio-authentication engine 105 may be configured to determine whether an anomaly has occurred and/or detect anomalous behavior. Anomalous behavior may include, for example, usage activity which the bio-authentication engine 105 determines not to fit the pattern of usage (e.g., outside of threshold expectations and/or predicted values) of the one or more subscribers associated with a streaming service account. In some embodiments, in response to determining that an anomaly has occurred, the bio-authentication engine may determine that the user accessing the streaming service account should be bio-authenticated. Thus, the bio-authentication engine 105 may be configured to determine whether to bio-authenticate a user based on the occurrence of an anomaly and/or anomalous behavior.

Accordingly, in various embodiments, once the bio-authentication engine 105 determines that a user should be bio-authenticated, the bio-authentication engine 105 may be configured to obtain a biometric input from the user. The biometric input may be an input of biometric information by the user to the bio-authentication engine 105. The biometric input may then be compared to stored biometric information, for example in the database 115, associated with the streaming service account. The bio-authentication engine 105 may then be configured to determine whether the biometric input matches the biometric information associated with the streaming service account.

Biometric information, both biometric inputs and stored biometric information associated with the streaming service account, may include one or more physiological markers and one or more behavioral markers. In some embodiments, the bio-authentication engine 105 may be configured to determine a type of biometric information to obtain from a user for bio-authentication. For example, the bio-authentication engine 105 may determine types of stored biometric information associated with a respective streaming service account. Thus, the bio-authentication engine 105 may be configured to obtain the same type of biometric information from the biometric input. Types of biometric information may include different types of physiological markers and different types of behavioral markers. Physiological markers may include measurable physiological characteristics. For example, types of physiological markers may include, without limitation, fingerprints, facial recognition, iris recognition, retinal scans, among other physical features. In contrast, behavioral markers may include measurable behavioral characteristics. For example, types of behavioral markers may include, without limitation, voice recognition, browsing habits, search history, usage patterns, interface manipulation, patterns and rhythms of usage, sequence of interaction, input speed (e.g., typing speed), reading speed, time spent on certain interfaces, among other behavioral characteristics.

In some embodiments, a user may be prompted to provide a biometric input. In some examples, the prompt may occur upon login by the user, at the next login of the user, in real-time upon determination by the bio-authentication engine 105 to bio-authenticate the user (e.g., a popup or redirect while the user is actively using the streaming service), before content begins to stream, or after the content has finished streaming. The user may then respond to the prompt by providing a biometric input to the bio-authentication engine, as will be described in greater detail below.

Alternatively, in further embodiments, the bio-authentication engine 105 may be configured to obtain a biometric input automatically from the user. For example, in some embodiments, the bio-authentication engine 105 may be configured to cause a device used to access the streaming service to capture biometric information from the user. For example, the bio-authentication engine 105 may cause the user device 130a-130n, or remote device 160 to capture biometric information from the user via respective sensors 135, 165. For example, in some embodiments, the sensors 135, 165 may include a camera, iris scanner, retina scanner, hand scanner, facial recognition system, microphone, or other sensors that may automatically capture biometric information of user without further action by the user for the sensors 135, 165 to capture biometric information. In some embodiments, various behavioral markers may be obtained automatically by monitoring and/or capturing usage of the streaming service. For example, in some embodiments, behavioral markers may be obtained substantially in real-time, or by examining recent activity associated with a streaming service account. Accordingly, the bio-authentication engine 105 may be configured to automatically obtain a biometric input from the user, and in some examples, to automatically bio-authenticate the user.

In various embodiments, once the biometric input has been obtained, the bio-authentication engine 105 may be configured to authenticate the user. For example, the bio-authentication engine 105 may be configured to determine whether the biometric input matches the biometric information associated with the streaming service account. In some embodiments, the bio-authentication engine 105 may be configured to obtain stored biometric information associated with the streaming service account. In some embodiments, the stored biometric information may be provided by a subscribed (e.g., authorized user) during account creation or activation. In other embodiments, the stored biometric information may be cumulative of previous biometric inputs obtained by the bio-authentication engine 105 from the user associated with the streaming service account. In various embodiments, the stored biometric information may be retrieved from the database 115. In embodiments where the biometric input is a physiological marker, the bio-authentication engine 105 may be configured to compare information against a stored physiological marker of the same type to determine whether the obtained physiological marker matches with the stored physiological marker. Similarly, in embodiments where the biometric input is a behavioral marker, the bio-authentication engine 105 may be configured to compare information against a stored behavioral marker of the same type to determine whether the obtained behavioral marker matches with the stored behavioral marker.

In some further embodiments, the bio-authentication engine 105 may be configured to obtain the biometric input from a designated device. Accordingly, the bio-authentication engine 105 may be configured to perform two-step authentication for bio-authentication of a user. In some embodiments, a subscriber (e.g., an authorized user) may designate a device (such as a user device 130a-130n) to be used as a designated device for bio-authentication. Accordingly, the bio-authentication engine 105 may be configured to determine the designated device associated with the streaming service account, and to obtain a biometric input from the designated device. In other embodiments, a biometric input may be obtained from any of the user devices 130a-130n or remote device 160, or a subset of user devices 130a-130n or remote device 160. In yet further embodiments, biometric input may be obtained via a display device 140 or peripheral device 150 associated with a respective user device 130a, 130n.

In various embodiments, a subscriber may access the streaming service from one or more user devices 130a-130n. Some user devices 130 may be located within a customer premises 125. Some user devices, such as user device 135b, may be a mobile device that may or may not be associated with the customer premises 125. User devices 130 may include, without limitation, customer premises equipment such as a set top box, streaming media players, personal computers, laptops, tablets, smartphone, smart televisions, smart speakers, smart appliances, and other personal electronic devices.

In some embodiments, the user devices 130a-130n may respectively include one or more sensors 135a-135n. In various embodiments, the sensors 135 may include one or more biometric sensors. Biometric sensors may include sensors configured to obtain biometric inputs from a user accessing the streaming service account, including both physiological and behavioral markers. For example, biometric sensors may include, without limitation, fingerprint readers, face scanners, iris scanners, retinal scanners, cameras, and microphones. Thus, the sensors 135 may be configured to capture, scan, read, collect, receive, or otherwise obtain the biometric input of the user. The sensors 135 may also include other types of sensors configured to be accessible by the bio-authentication engine 105, for example, to determine the occurrence of one or more authentication events. Accordingly, other types of sensors may include, without limitation, a global navigation satellite system (GNSS) receiver, accelerometer, gyroscope, pedometer, motion detector, among other types of sensors. Accordingly, in various embodiments, the user devices 130 may be configured to obtain a biometric input from the user and to transmit the biometric input to the bio-authentication engine 105 via the network 120.

In some embodiments, the user device 130a-130n, such as user device 130b, may further include an authentication agent 175. The authentication agent 175 may include one or more instructions, executable by the user device 130b, to perform bio-authentication of the user. For example, in some embodiments, the authentication agent 175 may include an instance of the authentication logic 110. In some embodiments, the authentication agent 175 may be configured to interface with the bio-authentication engine 105, via the network 120, to access the resources (e.g., computing resources, data streams, etc.) of the bio-authentication engine 105. In yet further embodiments, the authentication agent 175 may further be configured to directly obtain biometric inputs from the one or more sensors 135b and perform bio-authentication locally using stored biometric information (either remote or local).

In some embodiments, the user devices 130 may further be coupled to a peripheral device. For example, user device 130a may be coupled to a display device 140. In some embodiments, the display device 140 may include one or more sensors 145. The one or more sensors 145, like the sensors 135, may include biometric sensors. Accordingly, in some embodiments, a peripheral device like the display device 140 may be configured to obtain a biometric input from the user. Other user devices may be coupled to other peripheral devices, such as peripheral device 150. Peripheral device 150 may include, for example, and without limitation, a mouse, keyboard, remote control, or display. The peripheral device may further include one or more sensors 155. Like the sensors 135, 145, the one or more sensors 155 may, in some examples, include biometric sensors configured to obtain a biometric input from the user.

In various embodiments, the system 100 may further include a remote device 160. A remote device 160 may include devices that may not be associated with a subscriber (e.g., authorized user). For example, the remote device 160 may include public devices, borrowed devices, or the devices of others who are not authorized users. Accordingly, in some embodiments, a subscriber may be able to access their streaming service account from a remote device 160 via bio-authentication. In some embodiments, the remote device 160, may include one or more sensors 165 for obtaining biometric input from the user. In some embodiments, access to the streaming service and/or bio-authentication at the remote device 160 may be handled differently by the bio-authentication engine 105. For example, when accessing the streaming service from the remote device 160, bio-authentication may be required each time a user logs in to the streaming service account, or periodically with a different time interval.

In further embodiments, one or more of the user devices 130a-130n, remote device 160, or bio-authentication engine 105 may be a virtual machine (VM) instance running a physical host machine. For example, in some embodiments, a user device 130a may be a VM instance used to access the streaming service. Thus, a user accessing the streaming service from a VM instance may be required to submit bio-authentication for the respective VM instance, in this case user device 130a. In some examples, a physical host machine may host both user device 130a and user device 130n. In some embodiments, both VM instances of user device 130a and user device 130n bio-authentication may be performed for both user device 130a and user device 130n. In other embodiments, bio-authentication may be performed for the physical host machine for all VM instances running on the host machine. For example, bio-authentication may be performed once, via the physical host machine, for both VM instances of user device 130a and user device 130n. Thus, bio-authentication may be performed for both physical machines and VM instances accessing a streaming service.

In various embodiments, the network 120 may include various types of communication networks. a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an IR network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, low-power wide area network (LPWAN) protocols, such as long range wide area network (LoRaWAN), narrowband IoT (NB-IoT); long term evolution (LTE); Neul; Sigfox; Ingenu; IPv6 over low-power wireless personal area network (6LoWPAN); Wi-Fi; cellular communications (e.g., 2G, 3G, 4G, 5G & LTE); Thread; near field communications (NFC); radio frequency identification (RFID); and/or any other wireless protocol; and/or any combination of these and/or other networks.

Accordingly, the bio-authentication engine 105, user devices 130, and remote device 160 may each include a communications subsystem to communicate over the network 120. Communications subsystems may include, without limitation, a modem chipset (wired, wireless, cellular, etc.), an infrared (IR) communication device, a wireless communication device and/or chipset (such as a Bluetooth™ device, an 802.11 device, a WiFi device, a WiMax device, a WWAN device, a Z-Wave device, a ZigBee device, cellular device, etc.), and/or the like. The communications subsystem may permit data to be exchanged with the network 120, with other computer or hardware systems, and/or with any other devices.

Figure 2:
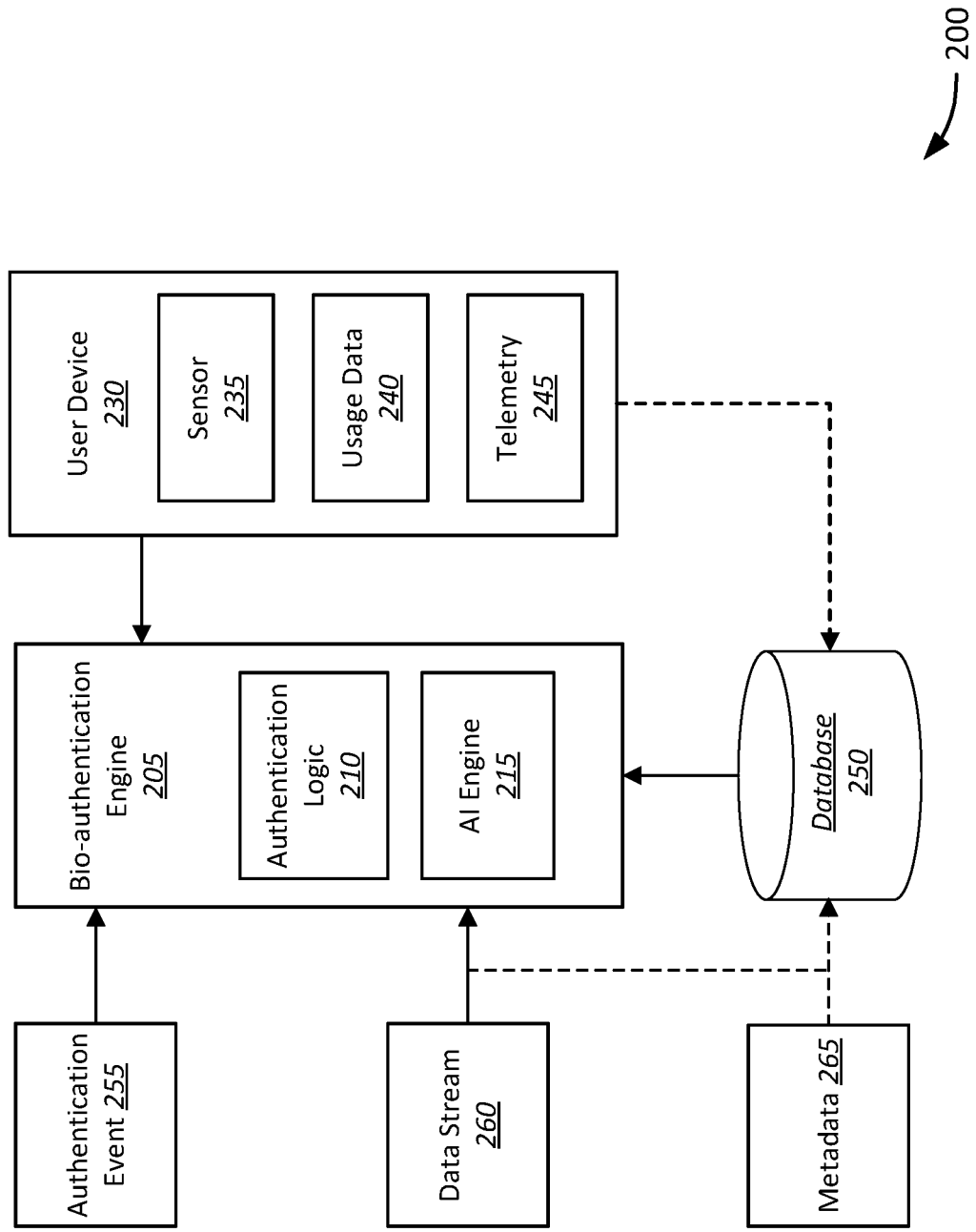
FIG. 2 is a schematic block diagram of a system for bio-authentication based streaming service account management, in accordance with various embodiments.

FIG. 2 is a schematic block diagram of a system 200 for bio-authentication based streaming service account management, in accordance with various embodiments. The system 200 may include a bio-authentication engine 205, user device 230, and database 250. The bio-authentication engine 205 may include authentication logic 210 and an AI engine 215. User device 230 may further include one or more sensors 235, usage data 20, and telemetry data 245. Bio-authentication engine 205 may include inputs for an authentication event 255, data stream 260, and/or metadata 265. Data stream 260 and metadata 265 may also be inputs to the database 250. It should be noted that the various components of the system 200 are schematically illustrated in FIG. 2, and that modifications to system 200 and its components may be possible in accordance with various embodiments.

In various embodiments, the bio-authentication engine 205 may be coupled to the user device 230, and database 250. The database 250 may be coupled to both the bio-authentication engine 205 and optionally the user device 230. Similarly, the user device 230 may also be coupled to each of the bio-authentication engine 205 and optionally, the database 250. As previously described, in various embodiments, the bio-authentication engine 205 may include authentication logic 210, and an AI engine 215. In some embodiments, the authentication logic 210 may include all or part of the AI engine 215 as part of the authentication logic 210. The bio-authentication engine 205 may include hardware, software, or both hardware and software.

In various embodiments, the bio-authentication engine 205 may be configured to determine when, and how, to bio-authenticate a user accessing a streaming service account. For example, in some embodiments, the bio-authentication engine 205 may be configured to determine whether to authenticate a user associated with a streaming service account based on the occurrence of an authentication event 225. An authentication event 225 may be configured to trigger the bio-authentication engine 205 to request, or alternatively, obtain biometric information from a user for bio-authentication. As previously described, an authentication event 225 may include events in which a streaming service account is accessed, but the identity of the user accessing the streaming service account is unknown. For example, authentication events may include, without limitation, account creation; or token-based (e.g., digital certificate, signature, etc.) and/or knowledge-based (e.g., username and password, pin number, etc.) logins into the streaming service account such as a first-time account login using token-based and/or knowledge-based authentication, multiple concurrent account logins using token-based and/or knowledge-based authentication, account login from a new device using token-based and/or knowledge-based authentication, account login from a new network location using token-based and/or knowledge-based authentication, account login from a new physical location using token-based and/or knowledge-based authentication. In further embodiments, an authentication event 255 may be time-based, and configured to occur, for example, periodically or after the expiration of a time-out period from the last bio-authentication. Time-based authentication events 225 may, in some examples, be device specific and thus occur periodically for each device logged into a streaming service account. Alternatively, time-based authentication events may be associated with the streaming service account across all devices. Thus, an authentication event 225 may cause a user to bio-authenticate across all devices associated with the streaming service account, or alternatively, a bio-authentication at one device may be sufficient across all devices associated with the streaming service account. In further embodiments, an authentication event 225 may be triggered upon request, for example, by a streaming service provider.

In various embodiments, the bio-authentication engine 205 may include authentication logic 210. Authentication logic 210 may include a computer readable medium including one or more machine readable instructions that are executable by the hardware and/or software of the bio-authentication engine 205 to perform various functions. In some embodiments, the authentication logic 210 may further include, for example, an AI engine 215 configured to automatically determine situations in which bio-authentication should be triggered. For example, in some embodiments, the AI engine 215 may be configured to obtain one or more data streams 260 associated with a streaming service account, or alternatively data streams 260 associated with multiple streaming service accounts across a streaming service platform.

Thus, in some embodiments, the bio-authentication engine 205 may be configured to decide, based on one or more data streams 260, inputs from the database 250, or user device 230, whether to request bio-authentication of a user. The one or more data streams 260, inputs from the database 250, or user device 230 may include various types of data associated with one or more streaming service accounts and/or subscribers (e.g., authorized users) associated with the streaming service accounts. For example, the one or more data streams 260 may include, for example, sensor data 235, usage data 240, and telemetry data 245. Usage data 240 may include subscriber information, service attributes, subscription information, and other usage information. Telemetry data 245 may include performance metrics, state information, fault information, and other telemetry data. In some embodiments, the sensor data 235, usage data 240, and telemetry data 245 may be obtained directly from the user device 230, via the database 250, or from other devices via the data stream 260. The bio-authentication engine may further be configured to obtain metadata about the one or more subscribers, such as types of content, browsing history, browsing patterns, titles of programs, favorite actors, recent activity, language, closed captioning information, electronic programming guide information, other information about a subscriber's usage of the streaming service.

In some embodiments, the AI engine 215 of the bio-authentication engine 205 may utilize a rules-based approach to determining whether to bio-authenticate a user. For example, in some embodiments, one or more thresholds for one or more respective rules may be determined by the AI engine 215. The one or more thresholds may indicate respective threshold values for one or more data streams associated with a streaming service account. If a threshold is exceeded, a user associated with the streaming service account may be bio-authenticated. In some embodiments, the one or more thresholds may be determined based on information from one or more data streams associated with the streaming service account. In other embodiments, the one or more thresholds may be determined based on information from one or more data streams 260, data from the database 250, sensor data 235, usage data 240, or telemetry data 245. In other embodiments, the AI engine 215 may be configured to implement a correlation-based approach. For example, the AI engine 215 may be configured to construct groupings and relationships based on one or more data streams. In some examples, the bio-authentication engine 205 may be configured to determine whether an anomaly has occurred. For example, the bio-authentication engine 205 may be configured to generate, based on historic usage activity (e.g., usage pattern), a predicted pattern of usage for a streaming service account. Accordingly, the bio-authentication engine 205 may be configured to determine whether an anomaly has occurred and/or detect anomalous behavior. Anomalous behavior may include, for example, usage activity which the bio-authentication engine 205 determines not to fit the pattern of usage (e.g., outside of threshold expectations and/or predicted values) of the one or more subscribers associated with a streaming service account. Thus, in some embodiments, the bio-authentication engine 205 may be configured to determine whether to bio-authenticate a user based on the occurrence of an anomaly and/or anomalous behavior.

Once bio-authentication has been requested, a biometric input may be obtained via the user device 230. For example, the bio-authentication engine 205 may be configured to cause the user device 230 to prompt a user for biometric input. The biometric input may be provided as sensor data 235, to the bio-authentication engine 205. In some embodiments, the biometric input may be provided directly to the bio-authentication engine 205. In some embodiments, the user device 230 may be configured to transmit the sensor data 235, including the biometric input, to the database 250 in addition to, or instead of, transmitting the sensor data 235 directly to the bio-authentication engine 205.

Figure 3:
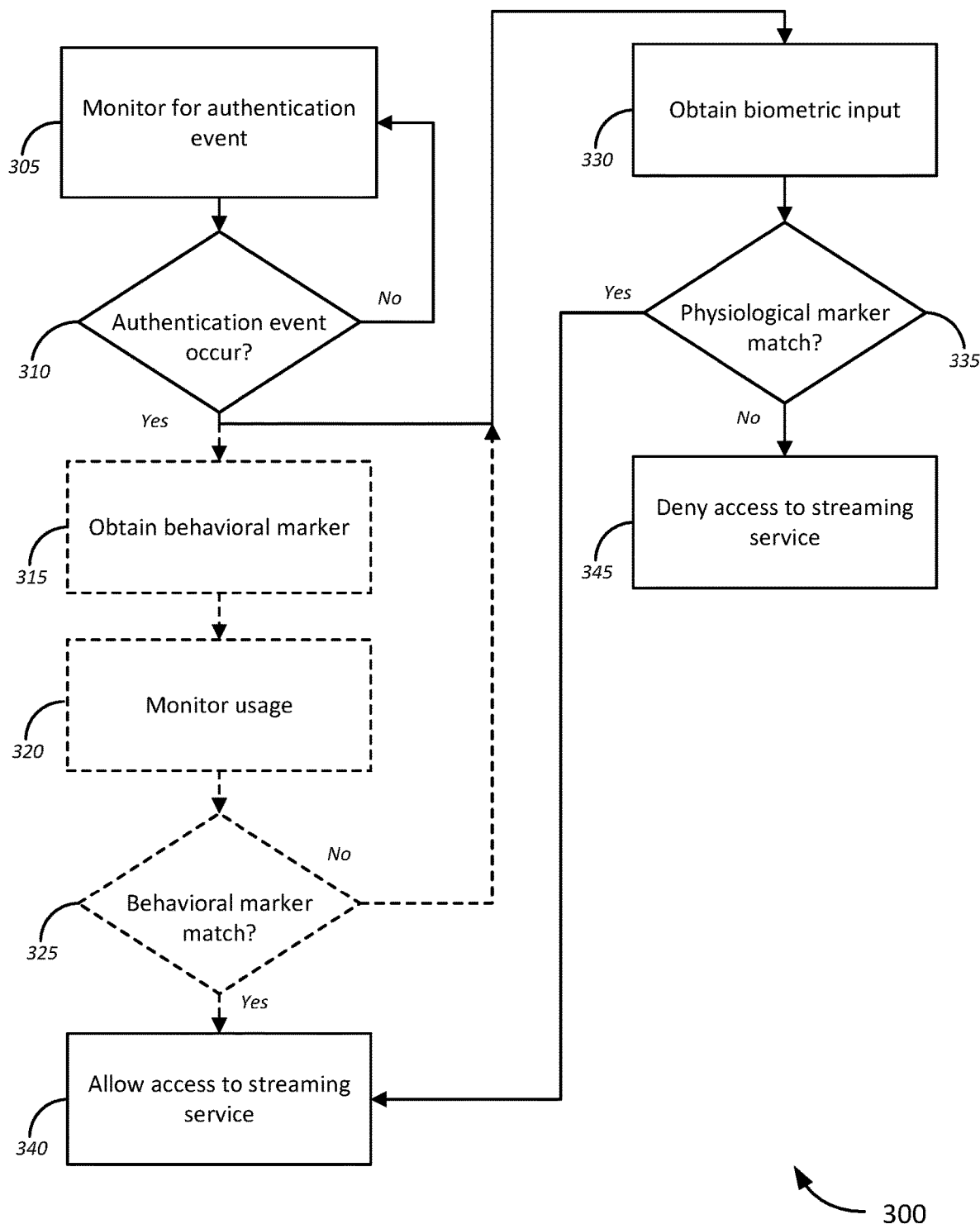
FIG. 3 is a flow diagram of a method for bio-authentication based streaming service account management, in accordance with various embodiments.

FIG. 3 is a flow diagram of a method for bio-authentication based streaming service account management, in accordance with various embodiments. The method 300 begins, at block 305, by monitoring for an authentication event, and at decision block 310, by determining whether an authentication event has occurred. As previously described, an authentication event may include, without limitation, events in which a streaming service account is accessed, but the identity of the user accessing the streaming service account is unknown. For example, authentication events may include account creation, a token-based login, a knowledge-based login, multiple concurrent logins, new device logins, logins from a new or different network location from the previous login, or logins from a new or different physical location from the previous login. Authentication events may further include time-based events, such as periodic bio-authentication, or bio-authentication upon expiration of a timeout period. In yet further embodiments, authentication events may be triggered by a streaming service provider.

If, at decision block 310, it is determined that an authorization event has not occurred, the method 300 may continue, at block 305, to monitor for an authentication event. When an authorization event is determined to have occurred, the method may continue, at optional block 315, by obtaining a behavioral marker. As previously described, the biometric information of a user may include both physiological markers and behavioral markers. Behavioral markers may include measurable behavioral characteristics, such as, without limitation, voice recognition, browsing habits, search history, usage patterns, interface manipulation, patterns and rhythms of usage, sequence of interaction, input speed (e.g., typing speed), reading speed, time spent on certain interfaces, among other behavioral characteristics. Thus, in some embodiments, to obtain a behavioral marker, a user may be prompted to provide a biometric input containing the behavioral marker. For example, a user may be prompted to read a word, phrase, or sentence to obtain the user's voice as a biometric input. In some further embodiments, the behavioral marker may be obtained automatically, without prompting the user. For example, at block 320, the method 300 may include monitoring usage activity. Thus, in some embodiments, the bio-authentication engine may be configured to monitor usage activity of a user for various behavioral markers, in substantially real-time, after a specified delay, or over a window of time.

At decision block 325, it is determined whether there is a behavioral marker match. In various embodiments, the bio-authentication engine may be configured to determine whether a stored behavioral marker, associated with a subscriber (e.g., authorized user) of a respective streaming service account and matches the obtained behavioral marker. If there is no match, the method 300 may continue, to block 330, to obtain an additional biometric input. If there is a behavioral marker match, the method 300 may continue, at block 340, by allowing access to the streaming service.

Thus, at block 330, the method 300 may include obtaining a biometric input. As previously described, the biometric input may include biometric information obtained from a user accessing the streaming service account. Biometric information may include both physiological and behavioral markers. In various embodiments, obtaining a biometric input may include prompting a user to provide a biometric input, or in some examples, automatically obtaining a biometric input from a user. Obtaining the biometric input from a user may include obtaining the biometric information of a user via a biometric sensor, such as, without limitation, a fingerprint reader, face scanner, iris scanner, retinal scanner, camera, or microphone. Thus, the sensors may be configured to obtain both physiological and behavioral markers.

At decision block 335, it is determined whether there is a physiological marker match. In various embodiments, the bio-authentication engine may be configured to determine whether a stored physiological marker, associated with a subscriber (e.g., authorized user) of a respective streaming service account and matches the obtained physiological marker. If there is no match, the method 300 may continue, at block 345, by denying access to the streaming content. If there is a physiological marker match, the method 300 may continue, at block 340, by allowing access to the streaming service.

Figure 4:
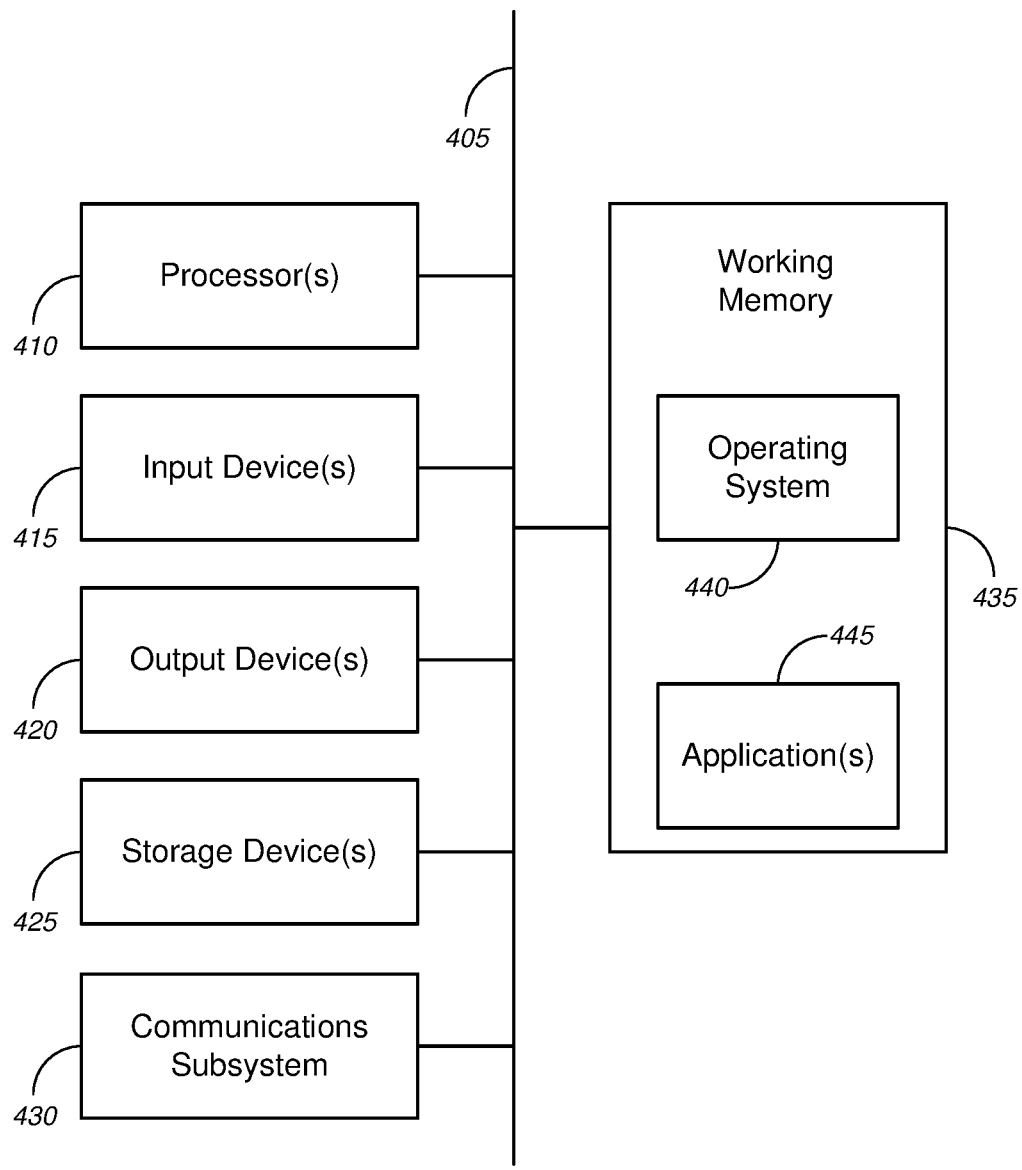
FIG. 4 is a schematic block diagram of a computer system for bio-authentication based streaming service account management, in accordance with various embodiments.

FIG. 4 is a schematic block diagram of a computer system 400 for bio-authentication based streaming service account management, in accordance with various embodiments. FIG. 4 provides a schematic illustration of one embodiment of a computer system 400, such as a bio-authentication engine or server computer hosting the bio-authentication engine, which may perform the methods provided by various other embodiments, as described herein. It should be noted that FIG. 4 only provides a generalized illustration of various components, of which one or more (or none) of each may be utilized as appropriate. FIG. 4, therefore, broadly illustrates how individual system elements may be implemented in a relatively separated or relatively more integrated manner.

The computer system 400 includes multiple hardware elements that may be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and microcontrollers); one or more input devices 415, which include, without limitation, a mouse, a keyboard, one or more sensors, and/or the like; and one or more output devices 420, which can include, without limitation, a display device, and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 400 might also include a communications subsystem 430, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or the like. The communications subsystem 430 may permit data to be exchanged with a network (such as the network described below, to name one example), with other computer or hardware systems, between data centers or different cloud platforms, and/or with any other devices described herein. In many embodiments, the computer system 400 further comprises a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments (including, without limitation, a bio-authentication engine, authentication logic, AI engine, or authentication agent configured to perform the processes described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally receives the signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
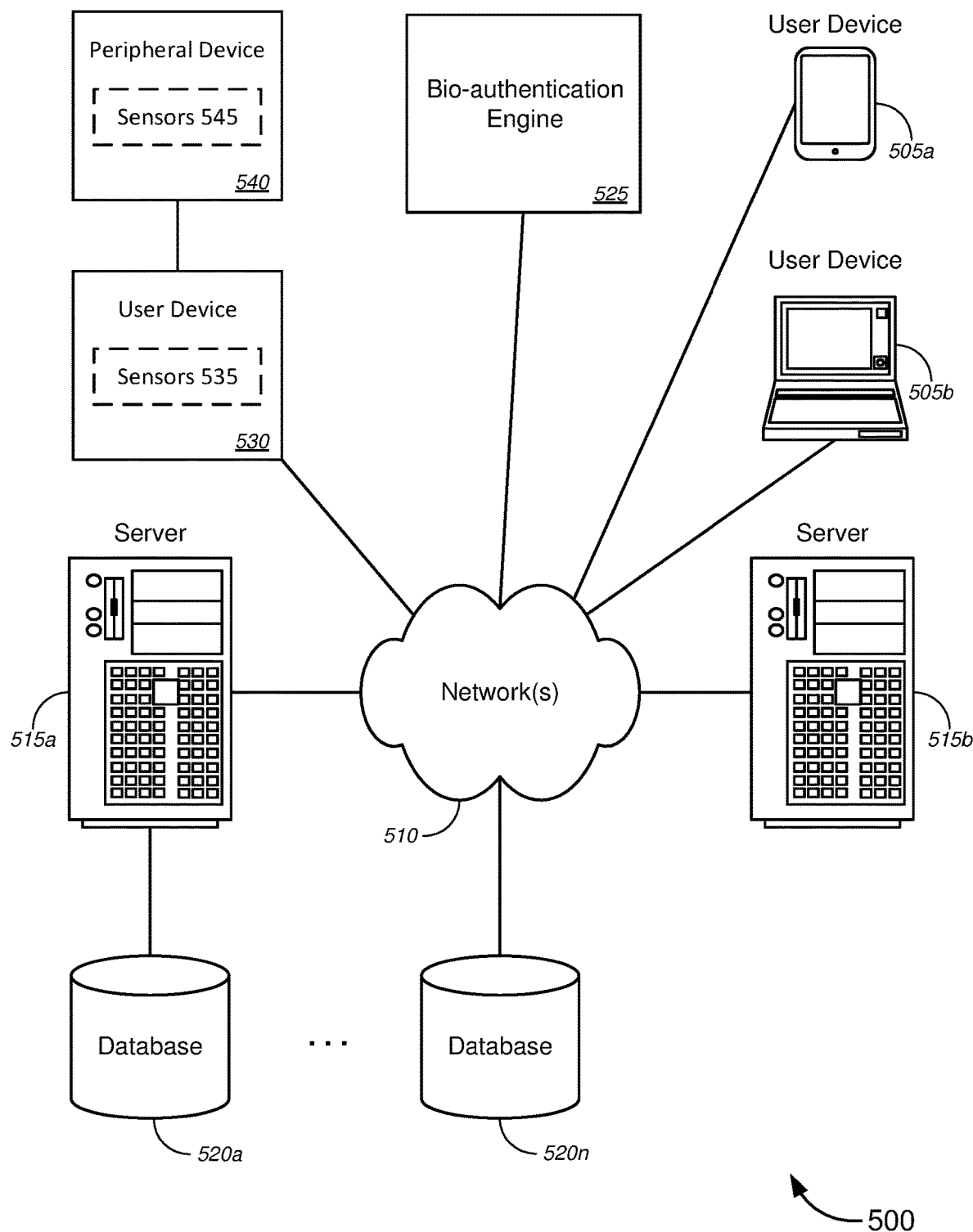
FIG. 5 is a block diagram illustrating a networked system of computing systems, which may be used in accordance with various embodiments.

FIG. 5 is a block diagram illustrating a networked system 500 of computing systems, which may be used in accordance with various embodiments. The system 500 may include one or more user devices 505. A user device 505 may include, merely by way of example, desktop computers, single-board computers, tablet computers, laptop computers, handheld computers, and the like, running an appropriate operating system, which in various embodiments may include an AI engine and/or learning API as previously described. User devices 505 may further include cloud computing devices, internet of things (IoT) devices, servers, and/or workstation computers running any of a variety of operating systems. In some embodiments, the operating systems may include commercially-available UNIX™ or UNIX-like operating systems. A user device 505 may also have any of a variety of applications, including one or more applications configured to perform methods provided by various embodiments (as described above, for example, an AI agent), as well as one or more office applications, database client and/or server applications, and/or web browser applications. Alternatively, a user device 505 may include any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user devices 505, any number of user devices 505 may be supported.

Certain embodiments operate in a networked environment, which can include a network(s) 510. The network(s) 510 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. Merely by way of example, the network(s) 510 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 might be a data server, a web server, a cloud computing device(s), or the like, as described above. The data server might include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more application servers, which can be configured with one or more applications, programs (such as a bio-authentication engine 525, AI engine, or authentication logic as previously described), web-based services, or other network resources accessible by a client (e.g., user device 505, 530, or an authentication agent being executed by the user device 505, 530). Merely by way of example, the server(s) 515 can be one or more general purpose computers capable of executing programs or scripts in response to the user devices 505 and/or other servers 515, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505, 530 and/or another server 515. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is illustrated schematically, and in various embodiments, different configurations may be implemented. For example, a database 520a might reside on a storage medium local to (and/or resident in) a server 515a (or alternatively, user device 505). Alternatively, a database 520n can be remotely accessible, so long as it is in communication with the network 510. In some embodiments, a database 520 may reside in a storage-area network ("SAN"). (Likewise, any necessary files for performing the functions described above may be stored locally on a respective device, or remotely, as appropriate.) In one set of embodiments, the database 520 may be a relational database configured to host one or more data lakes collected from various data sources, such as the user devices 505, 530, sensors 535, 545, or other sources. Relational databases may include, for example, an Oracle database, that is adapted to store, update, and retrieve data in response to SQL-formatted commands. The database might be controlled and/or maintained by a database server.

The system 500 may further include a bio-authentication engine 525 as a standalone device. In various embodiments, the bio-authentication engine 525 may be communicatively coupled to other devices, such as user devices 505, servers 515, databases 520, user device 530, or peripheral device 540 directly or via network(s) 510. The bio-authentication engine 525 may include, without limitation, server computers, workstations, desktop computers, tablet computers, laptop computers, handheld computers, single-board computers and the like, running the bio-authentication engine 525, authorization logic, authorization agent, or an AI engine as previously described. The bio-authentication engine 525 may further include cloud computing devices, servers, and/or workstation computers running any of a variety of operating systems, as previously described.

The system 500 may further include a user device 530 including one or more sensors 535. The user device 530 may further be coupled to a peripheral device 540. The peripheral device 540 may itself optionally include one or more sensors. Both sets of sensors 535, 545 may include one or more biometric sensors configured to obtain biometric inputs from a user. Thus, the user device 530 and/or peripheral device 540 may be communication with the bio-authentication engine 525, and configured to transmit obtained biometric inputs, obtained from respective sensors 535, 545. Thus, in some embodiments, the bio-authentication engine 525, or optionally an authorization agent, may be configured to obtain biometric inputs from the sensors 535, 545. In some examples, the user device 530 may be configured to receive biometric inputs, obtained by the one or more sensors 545. The user device may further be configured to transmit the biometric inputs, obtained from the one or more sensors 535, or the one or more sensors 545 of the peripheral device, via the network 510, to one or more of the databases 520.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a user device configured to access a first streaming service account, wherein the first streaming service account is associated with a first subscriber authorized to access the first streaming service account;
   a database configured to store a plurality of biometric information of a plurality of subscribers associated with a plurality of respective streaming service accounts, wherein each biometric information is uniquely associated with a respective streaming service account of a respective subscriber, and wherein the plurality of biometric information comprises a first biometric information uniquely associated with the first streaming service account of the first subscriber;
   a biometric sensor configured to obtain a biometric input from a user;
   a bio-authentication engine in communication with the user device, database, and the biometric sensor, the bio-authentication engine comprising:

a processor;
a non-transitory computer readable medium comprising instructions executable by the processor to:
  determine whether an authentication event has occurred;
  in response to determining that the authentication event has occurred, obtain, via the biometric sensor, the biometric input of the user;
  determine a streaming service account that the user is authorized to access based on the biometric input, wherein determining the streaming service account that the user is authorized to access further comprises a comparison of the biometric input to the plurality of biometric information, wherein the plurality of biometric information includes the first biometric information uniquely associated with the first streaming service account, and identification of the first streaming service account associated with the first biometric information;
  determine that the user is authorized to access the first streaming service account based on a determination that the biometric input of the user matches the first biometric information associated with the first streaming service account;
  in response to determining that the biometric input matches the first biometric information, allow the user to access the first streaming service account associated with the first subscriber; and
  access a streaming service from the user device through the streaming service account.

2. The system of claim 1, further comprising a peripheral device in communication with the user device, the peripheral device comprising the biometric sensor.

3. The system of claim 1, wherein the biometric information associated with the subscriber and the biometric input obtained from the user is a physiological marker, wherein the physiological marker includes at least one of a fingerprint, face, iris scan, or retina scan.

4. The system of claim 1, wherein the biometric information associated with the subscriber and the biometric input obtained from the user is a behavioral marker, the behavioral marker including at least one of a voice or usage information.

5. The system of claim 1, wherein the instructions are further executable by the processor to:
  prompt, via the user device, the user to provide the biometric input to the biometric sensor; and
  receive, via the biometric sensor, the biometric input from the user.

6. The system of claim 1, wherein the instructions are further executable by the processor to:
  automatically obtain, via the biometric sensor, the biometric input from the user, wherein automatically obtaining the biometric input includes automatically capturing biometric information of the user.

7. The system of claim 1, wherein the bio-authentication engine further comprises an artificial intelligence engine, wherein the instructions are further executable by the processor to:
  obtain, via at least one of the user device or database, a data stream including at least one of usage data or telemetry data associated with the streaming service account;
  determine, via the artificial intelligence engine, whether an anomaly has occurred based on the data stream; and
  determine, via the artificial intelligence engine, whether the authentication event occurred based at least in part on a determination that the anomaly has occurred.

8. The system of claim 1, wherein the instructions are further executable by the processor to:
  determine that the authentication event has occurred based on the occurrence of at least one of a login event, time-based event, or a trigger event.

9. The system of claim 1, wherein biometric sensor includes at least one of a camera, microphone, fingerprint scanner, iris scanner, retina scanner, hand scanner, or facial recognition system.

10. The system of claim 1, wherein the instructions are further executable by the processor to:
  determine that the authentication event has occurred based on access to the streaming service account by a remote device; and
  authorizing access to the streaming service by the remote device based on the biometric input obtained from the biometric sensor.

11. An apparatus comprising:
a processor;
a non-transitory computer readable medium comprising instructions executable by the processor to:
  determine whether an authentication event has occurred;
  in response to determining that the authentication event has occurred, obtain, via a biometric sensor, a biometric input of a user;
  determine a streaming service account that the user is authorized to access based on the biometric input,
    wherein determining the streaming service account that the user is authorized to access further comprises a comparison of the biometric input to a plurality of biometric information, wherein the plurality of biometric information includes a first biometric information uniquely associated with the first streaming service account, and identification of the first streaming service account associated with the first biometric information;
  determine that the user is authorized to access a first streaming service account based on a determination that the biometric input of the user matches a first biometric information of the plurality of biometric information;
  in response to determining that the biometric input matches the biometric information, allow the user to access the streaming service account associated with the subscriber; and
  access a streaming service through the streaming service account.

12. The apparatus of claim 11, wherein the biometric information associated with the subscriber and the biometric input obtained from the user is a physiological marker, wherein the physiological marker includes at least one of a fingerprint, face, iris scan, or retina scan.

13. The apparatus of claim 11, wherein the biometric information associated with the subscriber and the biometric input obtained from the user is a behavioral marker, the behavioral marker including at least one of a voice or usage information.

14. The apparatus of claim 11, wherein the instructions are further executable by the processor to:
  prompt, via a user device, the user to provide the biometric input to the biometric sensor; and
  receive, via the biometric sensor, the biometric input from the user.

15. The apparatus of claim 11, wherein the instructions are further executable by the processor to:
  automatically obtain, via the biometric sensor, the biometric input from the user, wherein automatically obtaining the biometric input includes automatically capturing biometric information of the user.

16. The apparatus of claim 11, wherein the instructions are further executable by the processor to:
  obtain, via at least one of a user device or database, a data stream including at least one of usage data or telemetry data associated with the streaming service account;
  determine, via an artificial intelligence engine, whether an anomaly has occurred based on the data stream; and
  determine, via the artificial intelligence engine, whether the authentication event occurred based at least in part on a determination that the anomaly has occurred.

17. A method comprising:
  determining, via a bio-authentication engine, whether an authentication event has occurred;
  in response to determining that the authentication event has occurred, obtaining, via a biometric sensor of a user device, a biometric input of a user;
  determining, via the bio-authentication engine, a streaming service account that the user is authorized to access based on the biometric input, wherein determining the streaming service account that the user is authorized to access further comprises comparing the biometric input to a plurality of biometric information, wherein the plurality of biometric information includes a first biometric information uniquely associated with the first streaming service account, and identification of the first streaming service account associated with the first biometric information;
  determining, via the bio-authentication engine, that the user is authorized to access a first streaming service account based on a determination that the biometric input matches a first biometric information of the plurality of biometric information;
  in response to determining that the biometric input matches the biometric information, allowing, via the bio-authentication engine, the user to access the streaming service account associated with the subscriber; and
  accessing, via the user device, a streaming service through the streaming service account.

18. The method of claim 17, further comprising:
  prompting, via the user device, the user to provide the biometric input to the biometric sensor; and
  receiving, via the biometric sensor, the biometric input from the user.

19. The method of claim 18, further comprising:
  automatically obtaining, via the biometric sensor, the biometric input from the user, wherein automatically obtaining the biometric input includes automatically capturing biometric information of the user.

20. The method of claim 17, further comprising:
  obtaining, via at least one of a user device or database, a data stream including at least one of usage data or telemetry data associated with the streaming service account;
  determining, via an artificial intelligence engine, whether an anomaly has occurred based on the data stream; and
  determining, via the artificial intelligence engine, whether the authentication event occurred based at least in part on a determination that the anomaly has occurred.

\* \* \* \* \*